US012593388B2

(12) United States Patent
Tsai et al.

(10) Patent No.: US 12,593,388 B2
(45) Date of Patent: Mar. 31, 2026

(54) DRIVER OF LIGHT EMITTING DIODE AND LIGHT EMITTING DEVICE

(71) Applicant: Novatek Microelectronics Corp., Hsinchu (TW)

(72) Inventors: Yi-Yang Tsai, Hsinchu County (TW); Hung-Ho Huang, Hsinchu City (TW); Tzong-Honge Shieh, Hsinchu County (TW); Chieh-An Lin, Taipei City (TW); Po-Hsiang Fang, Hsinchu County (TW); Jhih-Siou Cheng, New Taipei City (TW)

(73) Assignee: Movatek Microelectronics Corp., Hsinchu (TW)

( * ) Notice: Subject to any disclaimer, the term of this patent is extended or adjusted under 35 U.S.C. 154(b) by 65 days.

(21) Appl. No.: 18/582,653

(22) Filed: Feb. 21, 2024

(65) Prior Publication Data

US 2025/0203738 A1 Jun. 19, 2025

(30) Foreign Application Priority Data

Dec. 15, 2023 (TW) ................................ 112148960

(51) Int. Cl.
*H05B 47/17* (2020.01)
*H05B 45/30* (2020.01)

(52) U.S. Cl.
CPC ............. *H05B 47/17* (2020.01); *H05B 45/30* (2020.01)

(58) Field of Classification Search
None
See application file for complete search history.

(56) References Cited

U.S. PATENT DOCUMENTS 7,737,926 B2 * 6/2010 Huang ................. G09G 3/3413 345/82
7,855,702 B2 * 12/2010 Huang ................. G09G 3/3426 345/82
8,587,217 B2 * 11/2013 Melanson .............. H05B 45/48 315/312
9,723,667 B1 8/2017 Xiong et al.
(Continued)

FOREIGN PATENT DOCUMENTS

CN 107682090 2/2018

OTHER PUBLICATIONS

"Office Action of Taiwan Counterpart Application", issued on Nov. 20, 2024, p. 1-p. 5.

*Primary Examiner* — Kenneth B Wells
(74) *Attorney, Agent, or Firm* — JCIPRNET

(57) ABSTRACT

A driver of a light emitting diode (LED) and a light emitting device are provided. The driver includes a first receiver, a second receiver, a data controller, a transmitter, and a check controller. The first receiver receives a parallel data signal. The second receiver receives a serial data signal. The data controller obtains the parallel data signal through the first receiver and transmits the parallel data signal to a serial data output terminal through the transmitter for transmitting the parallel data signal to a next-stage driver. The check controller detects whether the parallel data signal is received through the first receiver and the serial data signal is received through the second receiver and generates a driving signal of the LED according to the received parallel data signal and the received serial data signal to illuminate the LED.

6 Claims, 6 Drawing Sheets

(56) References Cited

U.S. PATENT DOCUMENTS

| | | | |
|---|---|---|---|
| 9,961,725 | B2 | 5/2018 | Rolindez Alberich et al. |
| 2012/0091902 | A1 | 4/2012 | Radermacher |
| 2018/0035498 | A1 | 2/2018 | Rolindez Alberich et al. |

* cited by examiner

DRIVER OF LIGHT EMITTING DIODE AND LIGHT EMITTING DEVICE

CROSS-REFERENCE TO RELATED APPLICATION

This application claims the priority benefit of Taiwan application serial no. 112148960, filed on Dec. 15, 2023. The entirety of the above-mentioned patent application is hereby incorporated by reference herein and made a part of this specification.

BACKGROUND

Technical Field

The disclosure relates to a technology for inspecting the functionality of elements on a panel, and particularly to a driver of a light emitting diode (LED) and a light emitting device.

Description of Related Art

Displays have consistently held a prominent position in the consumer market. Apart from a liquid crystal panel, a liquid crystal display (LCD) requires a backlight module for light emission. Relevant elements are soldered onto a substrate (such as a plastic substrate, a glass substrate, a tape substrate, and so forth) utilized by the backlight module, and the elements include external passive elements, LED lamps, driving chips, and other elements.

Determining the presence of issues of abnormal circuit connections, such as false soldering, empty soldering, short circuits, open circuits, in the elements affixed to the substrate is challenging through visual appearance or alternative methods. Consequently, post-soldering inspection remains imperative to verify the normal functionality of these elements. Besides, the LED lamp or the driving chip on the backlight module commonly transmit display data according to a serial communication protocol. In instances where a driving chip exhibits circuit connection abnormalities, not only is the affected driving chip unable to display, but subsequent elements serially connected to the driving chip are also affected. In cases where a significant number of elements are connected in series to the faulty driving chip, ascertaining the integrity of these elements becomes unfeasible. Therefore, after the replacement of the faulty driving chip, the panel should be illuminated again, and a repeated inspection methodology is employed to ensure the normal functioning of subsequently serially connected driving chips.

SUMMARY

The disclosure provides a driver of a light emitting diode (LED) and a light emitting device to assess potential connection abnormalities in relevant signal circuits across multiple stages of drivers at once by adopting a signal path structure corresponding to a test mode of the driver.

According to an embodiment of the disclosure, a driver of an LED includes a first receiver, a second receiver, a data controller, a transmitter, and a check controller. The first receiver receives a parallel data signal. The second receiver receives a serial data signal. The data controller is coupled to the first receiver. The transmitter is coupled to the data controller. The data controller obtains the parallel data signal through the first receiver and transmits the parallel data signal to a serial data output terminal through the transmitter to transmit the parallel data signal to a next-stage driver. The check controller is coupled to the first receiver and the second receiver, detects whether the parallel data signal is received through the first receiver and whether the serial data signal is received through the second receiver, and generates a driving signal of the LED based on the received parallel data signal and the received serial data signal to illuminate the LED.

According to an embodiment of the disclosure, a light emitting device includes a driving device. The driving device includes a first driver and a second driver. The first driver drives a first LED module and includes a first serial data input terminal, a first parallel data input terminal, and a first serial data output terminal. The first serial data input terminal is configured to receive serial data. The first parallel data input terminal is configured to receive parallel data. The second driver is coupled to the first driver and configured to drive a second LED module, and the second driver includes a second serial data input terminal, a second parallel data input terminal, and a second serial data output terminal. The second serial data input terminal is coupled to the first serial data output terminal of the first driver. The second parallel data input terminal is configured to receive the parallel data. When the driving device operates in a first mode, the first serial data output terminal of the first driver outputs the serial data, and when the driving device operates in a second mode, the first serial data output terminal of the first driver outputs the parallel data.

As such, in the driver of the LED and the light emitting device provided in one or more embodiments of the disclosure, each driver is equipped with a signal path structure corresponding to the test mode. This configuration involves transmitting the parallel data signal from a preceding-stage driver to the serial data input terminal of the next-stage driver, effectively converting the parallel data signal into the serial data signal for the next-stage driver. This mitigates the challenge of being unable to examine the driver at the end of a series of multiple stages of serially connected drivers due to potential circuit connection abnormalities in the serial-type data path. Accordingly, in one or more embodiments of the disclosure, the connection abnormalities in the relevant signal circuits across the multiple stages of drivers may be checked simultaneously by utilizing the signal path structure corresponding to the test mode of the driver, whereby the repetitive work hours required by operating staff during the inspection process may be reduced.

Several exemplary embodiments accompanied with figures are described in detail below to further describe the disclosure in detail.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
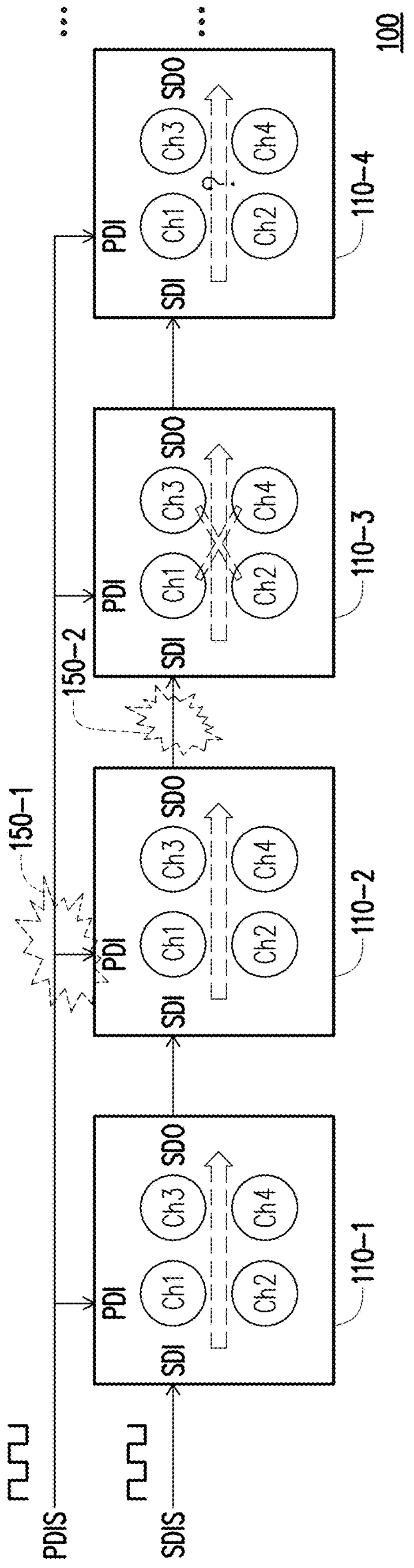
FIG. 1 (Related Art)
FIG. 1 is a schematic view of a light emitting device according to an embodiment of the related art.

FIG. 1 is a schematic view of a light emitting device 100 according to an embodiment of the related art. The light emitting device 100 may serve as a backlight module of a display or as a display driving device of a light emitting diode (LED). The light emitting device 100 includes a plurality of drivers (e.g., drivers 110-1~110-4 in FIG. 1) and LED modules (e.g., LED modules ch1~ch4 in FIG. 1). Each of the LED modules ch1~ch4 includes at least one LED, and these LEDs may emit light of different colors. For instance, the LED modules ch1~ch4 may respectively have red, blue, green, and white LEDs or LED lamp strings. The light emitting device 100 is a light panel integrated by controlling a light emitting brightness of the LED modules ch1~ch4 through sequentially arranged multi-stage drivers 110-1~110-4, in series; through a light guide plate, a prism sheet, a diffusion sheet, and other similar elements (not shown in FIG. 1), the backlight module may emit light in a uniform manner to a liquid crystal panel. The drivers may be implemented in the form of driving chips.

The drivers 110-1~110-4 depicted in FIG. 1 are mainly controlled by two data, one is parallel data PDIS (also known as a parallel data signal), and the other is serial data SDIS (also known as a serial data signal). The parallel data PDIS and the serial data SDIS may be provided by a controller (not shown). A preceding-stage driver provides a next-stage driver brightness data or chip setting data in the serial data SDIS. For instance, the driver 110-1 receives the brightness data or the chip setting data at a serial data input terminal SDI and transmits these data to the next-stage driver 110-2 through a serial data output terminal SDO of the driver 110-1; the driver 110-2 receives the brightness data or the chip setting data at its the serial data input terminal SDI and transmits these data to the next-stage driver 110-3 through a serial data output terminal SDO of the driver 110-2, and the rest may be deduced therefrom. In other words, a transmission path of the serial data SDIS is a serial-type data path. A transmission path of the parallel data PDIS is a multidrop path, which is configured to allow the drivers 110-1~110-4 to receive common setting data and provide synchronous data signals.

During the manufacture of the light emitting device 100, the path of the parallel data PDIS, the path of the serial data SDIS, and connection paths between the drivers 110-1~110-4 are arranged on a substrate, and each of the drivers 110-1~110-4 is soldered to a corresponding location on the substrate. Soldering elements onto the substrate may cause abnormal circuit connections; however, it is difficult to quickly and accurately determine where the circuit connection abnormality occurs when checking whether the drivers 110-1~110-4 operate normally.

For instance, according to this embodiment, a pattern signal is provided as the parallel data PDIS and the serial data SDIS to check whether the drivers 110-1~110-4 operate normally. Given that there are abnormal circuit connections at regions 150-1 and 150-2 in FIG. 1 due to soldering, the driver 110-1 may normally receive the parallel data PDIS and the serial data SDIS and may operate normally. The driver 110-2, however, does not operate normally because the driver 110-2 cannot receive the parallel data PDIS, and the driver 110-3 does not operate normally because driver 110-3 cannot receive the serial data SDIS. Nevertheless, since the path of the serial data SDIS is a serial-type signal path, and due to the damaged region 150-2 on the path of transmitting the serial data SDIS between the driver 110-2 and the driver 110-3, the serial data SDIS is not be transmitted to the driver 110-4, and therefore it is impossible to know whether the driver 110-4 operates normally.

If one intends to learn whether the driver 110-4 operates normally, it is necessary to first repair the abnormal circuit connections at the regions 150-1 and 150-2 in FIG. 1 and then check the drivers 110-1~110-4 again to clearly inspect whether the function of the driver 110-4 is normal. If the number of drivers serially connected in the light emitting device 100 is significant, it may be necessary to repeatedly perform the above-mentioned checks during the inspection, so as to gradually complete the repair of each abnormal circuit connection in the light emitting device 100.

Therefore, according to an embodiment of the disclosure, a signal path structure corresponding to a test mode is provided, and the signal path structure may allow an effective detection of whether the driver has abnormal circuit connections without needing of repeated checks as shown in FIG. 1. Specifically, according to this embodiment of the disclosure, the parallel data signal in the preceding-stage driver is transmitted to the serial data input terminal of the next-stage driver as the serial data signal of the next-stage driver, thereby avoiding the inability to check the driver at the end of the multiple stages of serially connected drivers due to the abnormal circuit connections in the serial-type data path. As such, an inspector may directly replace or repair the driver with connection issues in the light emitting device, thereby facilitating the repair of the entire light emitting device.

Figure 2:
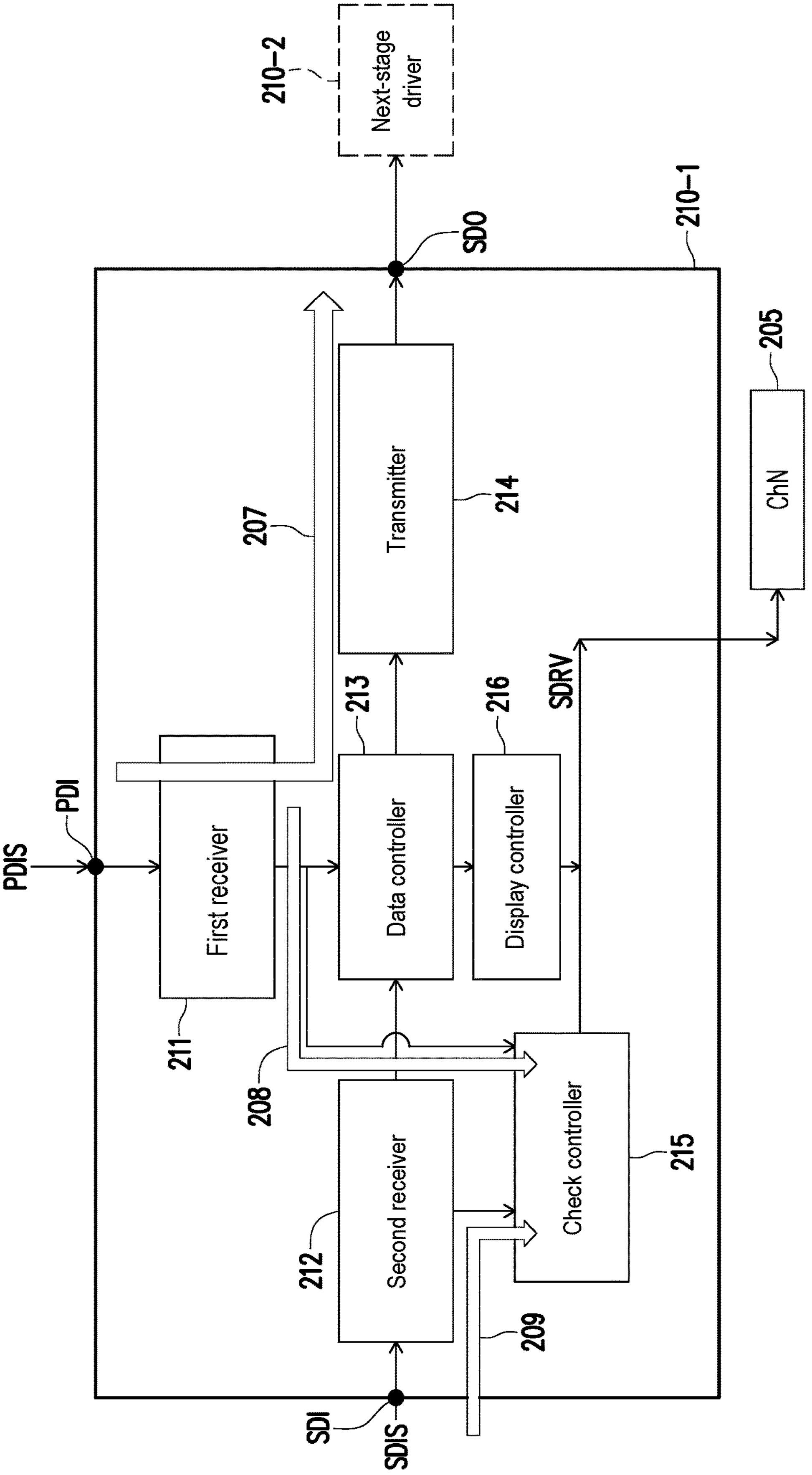
FIG. 2 is a functional block view of a driver according to an embodiment of the disclosure.

FIG. 2 is a functional block view of a driver 210-1 according to an embodiment of the disclosure. The driver 210-1 may be a driving chip of a light emitting device in a display, and the light emitting device may be controlled by multiple stages of serially connected drivers (such as a driver 210-1 and a next-stage driver 210-2) to control an LED module ChN 205. Here, N represents a positive integer. The driver 210-1 and its elements may be implemented in the form of hardware circuits or firmware devices, such as microprocessors, logic circuits, field programmable gate arrays (FPGA), and so on.

The driver 210-1 includes a first receiver 211, a second receiver 212, a data controller 213, a transmitter 214, and a check controller 215. The first receiver 211 receives the parallel data signal PDIS at a parallel data input terminal PDI of the driver 210-1. The second receiver 212 receives the serial data signal SDIS through a serial data input terminal SDI of the driver 210-1. The data controller 213 is coupled to the first receiver 211. The transmitter 214 is coupled to the data controller 213. The driver 210-1 further includes a display controller 216. The display controller 216 is coupled to the data controller 213. In this embodiment, the first receiver 211 and the second receiver 212 are first-in-first-out (FIFO) receivers. The transmitter 214 in this embodiment is a first-in-first-out (FIFO) transmitter.

In this embodiment, the driver 210-1 has a first mode (e.g., a work mode) and a second mode (e.g., the test mode). These two modes may be switched by the data controller 213 after receiving the parallel data signal PDIS with a specific data arrangement. In another embodiment, the data controller 213 transmits the data from the first receiver 211 or the second receiver 212 to the next-stage driver 210-2 via the transmitter 207 according to a mode signal. In one embodiment, the data controller 213 transmits the received serial data signal SDIS to the serial data input terminal SDI of the next-stage driver 210-2 in the first mode, and the data controller 213 transmits the received parallel data signal PDIS to the serial data input terminal SDI of the next-stage driver 210-2 in the second mode.

In the test mode, the check controller 215 is enabled, and the display controller 216 is disabled; in the work mode, the check controller 215 is disabled, and the display controller 216 is enabled. In the work mode, the second receiver 212 is coupled to the data controller 213. In the work mode, the data controller 213 receives the serial data SDIS through the second receiver 212 and transmits display data in the serial data SDIS to the display controller 216. The display controller 216 generates a driving signal SDRV of the LED based on the display data to illuminate the LED module ChN 205. In other words, in the work mode, the serial data SDIS received by the second receiver 212 are transmitted to the data controller 213 but not transmitted to the disabled check controller 215.

In this embodiment, the test mode of the driver 210-1 has a corresponding signal path structure which allows a one-time inspection of whether there is a connection abnormality in the relevant signal circuits of multiple stages of drivers. Specifically, in the test mode, the data controller 213 obtains the parallel data PDIS via the first receiver 211 and transmits the parallel data PDIS to the serial data output terminal SDO of the driver 210-1 through the transmitter 214 to transmit the parallel data PDIS to the next-stage driver 210-2. The data path is shown by an arrow 207. The next-stage driver 210-2 receives the signal provided by the driver 210-1 (the preceding-stage driver) as the serial data in the next-stage driver 210-2 at the serial data input terminal of the next-stage driver 210-2. In other words, in the test mode, the serial data in the next-stage driver are the same as the parallel data in the preceding-stage driver. The parallel data PDIS in this embodiment have a check pattern signal (e.g., a preset disturbance signal and a check code for performing the inspection).

The check controller 215 detects whether the parallel data PDIS are received through the first receiver 211 (as shown by an arrow 208 in FIG. 2), and the check controller 215 further detects whether the serial data SDI are received via the second receiver 212 (as shown by an arrow 209 in FIG. 2). When the check controller 215 detects and receives the serial data SDI, such indicates that the connection between the serial data output terminal of the preceding-stage driver relative to the driver 210-1 and the serial data input terminal SDI of the driver 210-1 is normal, and there is no abnormality in the circuit connection, or the connection between a signal source of the serial data SDIS and the serial data input terminal SDI of the driver 210-1 is normal, and there is no abnormality in the circuit connection. When the check controller 215 detects and receives the parallel data PDIS, it indicates that the connection between a signal source of the parallel data PDIS and the parallel data input terminal PDI of the driver 210-1 is normal, and there is no abnormality in the circuit connection.

When the check controller 215 detects and receives both the parallel data PDIS and the serial data SDIS, such indicates that there is no abnormality in the connection between the relevant pins or circuits of the driver 210-1 (e.g., the connection between the arrows 208 and 209). Therefore, the check controller 215 generates the driving signal SDRV of the LED based on the parallel data PDIS and the serial data SDIS to illuminate the LED module ChN 205, which is coupled to and controlled by the check controller 215, so as to allow the inspector to visually ascertain the state of the driver 210-1.

By contrast, if the check controller 215 does not detect either or both of the parallel data PDIS and the serial data SDIS, the check controller 215 does not illuminate the LED module ChN 205. The inspector may then ascertain that there is an issue occurring in the corresponding driver of the non-illuminated LED module ChN 205, and the issue requires further processing.

Figure 3:
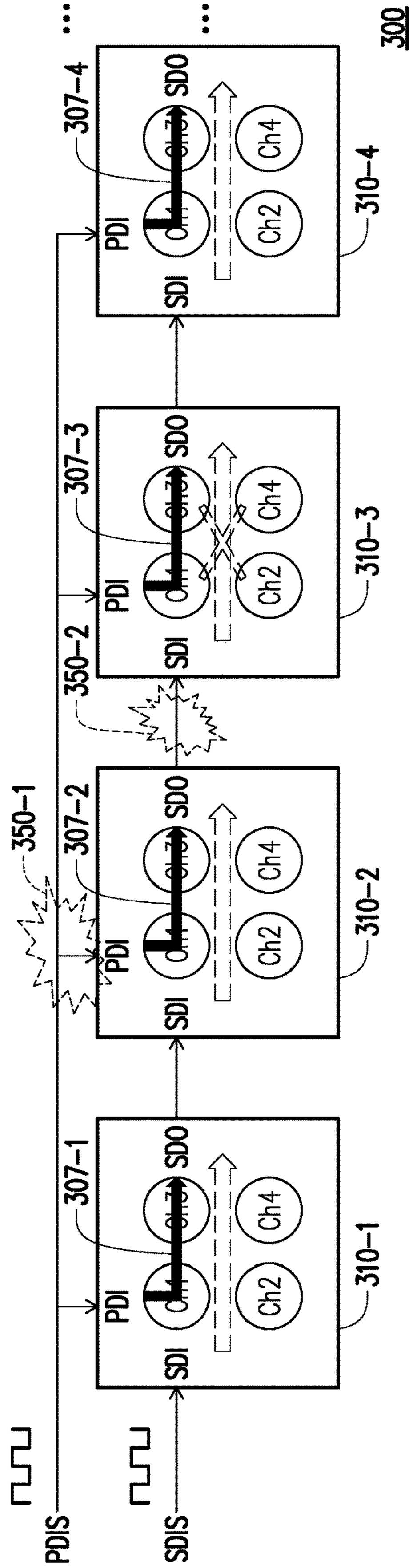
FIG. 3 is a schematic view of a light emitting device according to an embodiment of the disclosure.

FIG. 3 is a schematic view of a light emitting device 300 according to an embodiment of the disclosure. The light emitting device 300 may serve as a backlight module of a display or as a display driving device of an LED. The light emitting device 300 includes at least one driver (e.g., drivers 310-1~310-4) and at least one LED module (e.g., the LED modules ch1~ch4 respectively corresponding to the drivers 310-1~310-4). The circuit structure of each driver 310-1~310-4 provided in this embodiment as shown in FIG. 3 is the same as the driver 210-1 in FIG. 2. The driver 310-1 receives an external serial data SDIS and transmits the serial data SDIS to the next-stage driver 310-2 and so on in the work mode. In the test mode, the drivers 310-1~310-3 transmit the parallel data to the serial data input terminal of the next-stage drivers 310-2~310-4.

For a more detailed explanation, the signal path structure corresponding to the test mode configured in each driver may be applied to perform a one-time inspection of whether there is a connection abnormality in the relevant signal circuits of multiple stages of drivers. FIG. 3 mainly depicts the multiple stages of interconnected drivers 310-1~310-4. Here, arrows 307-1 to 307-4 marked on the drivers 310-1 to 310-4 serve to illustrate the data path between the parallel data input terminal PDI and the serial data output terminal SDO in each driver.

With reference to FIG. 3, when the drivers 310-1 to 310-4 are all set in the test mode, given that there is a circuit connection abnormality at regions 350-1 and 350-2 in FIG. 3 due to soldering, and internal circuits of the drivers 310-1 to 310-4 operate normally without any abnormalities, at this time, the driver 310-1 operates normally because the driver 310-1 may properly receive the parallel data PDIS and the serial data SDIS, and the data path marked by the arrow 307-1 allows normal passage. The driver 310-2 cannot receive the parallel data PDIS due to the damaged region 350-1, and the data path marked by the arrow 307-2 cannot allow the normal passage. Therefore, the check controller in the driver 310-2 does not illuminate the LED modules ch1~ch4 corresponding to the driver 310-2.

The driver 310-3 cannot receive the parallel data PDIS from the next-stage driver 310-2 due to the damaged regions 350-1 and 350-2, and thus the check controller in the driver 310-2 does not illuminate the LED modules ch1~ch4 corresponding to the driver 310-3. However, the circuit connection abnormalities at the regions 350-1 and 350-2 do not affect the data path marked by the arrow 307-3 in the driver 310-3. That is, the data path marked by the arrow 307-3 in the driver 310-3 allows normal passage, and thus the check pattern signal in the parallel data PDIS (e.g., a preset disturbance signal and a check code for performing the inspection) is normally transmitted to the driver 310-4. Accordingly, the driver 310-4 normally receives the parallel data PDIS and the serial data SDIS and operates normally, and the circuit connection abnormality at the region 350-2 does not affect the receipt of the check pattern signal.

Figure 4:
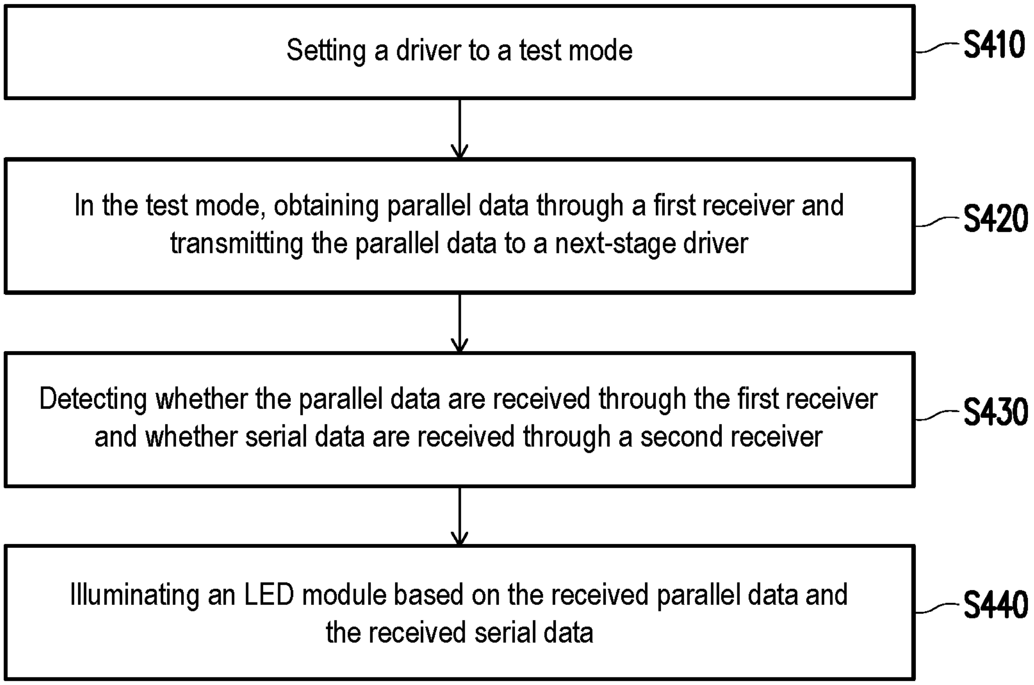
FIG. 4 is a flowchart of a method of driving a light emitting diode (LED) according to an embodiment of the disclosure.

FIG. 4 is a flowchart of a method of driving an LED according to an embodiment of the disclosure. The driving method depicted in FIG. 4 is applicable to the driver 210-1 in FIG. 2. With reference to FIG. 2 and FIG. 4, in step S410, the driver 210-1 in FIG. 2 is set to the test mode, and the driver in FIG. 2 includes the first receiver 211 and the second receiver 212. The parallel data PDIS with a specific data arrangement may be applied to set the driver 210-1 in FIG. 2 to the test mode.

In step S420, in the test mode, the data controller 213 in the driver 210-1 depicted in FIG. 2 obtains the parallel data PDIS through the first receiver 211 and transmits the parallel data PDIS to the next-stage driver 210-2 through the transmitter 214. In step S430, the check controller 215 in FIG. 2 detects whether the parallel data PDIS are received through the first receiver 211 and whether the serial data SDIS are received through the second receiver 212. In step S440, the check controller 215 illuminates the LED module ChN 205 based on the received parallel data PDIS and the received serial data SDIS. Details of the steps S410 to S440 may be referred to as those provided in the previous embodiments.

Figure 5:
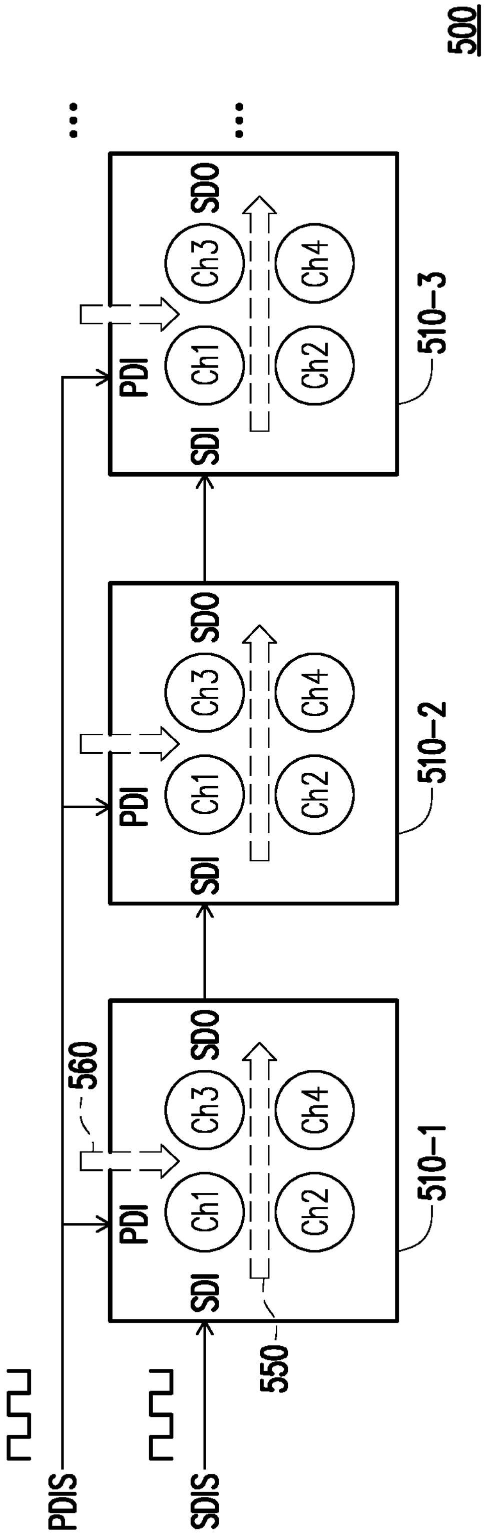
FIG. 5 and FIG. 6 are schematic views of a light emitting device according to another embodiment of the disclosure.
Figure 6:
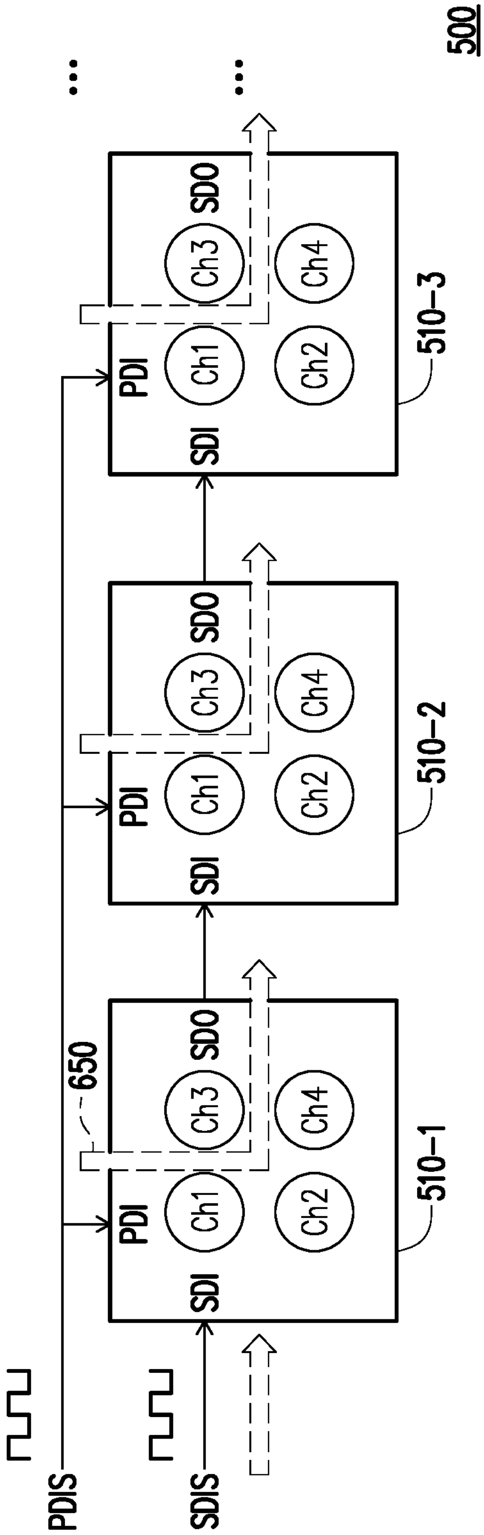

FIG. 5 and FIG. 6 are schematic views of a light emitting device 500 according to another embodiment of the disclosure. FIG. 5 may serve to explain the operation of each driver in the light emitting device 500 in the first mode (work mode). FIG. 5 illustrates the driving device in the light emitting device 500 (e.g., the first driver 510-1, the second driver 520-2, and the third driver 530-3). In the first mode (work mode), the serial data input terminal SDI of the first driver 510 receives the serial data SDIS from a controller (not shown) and transmits the received serial data SDIS to the serial data input terminal SDI of the second driver 510-2 through the serial data output terminal SDO (as shown by an arrow 550 represented in dash lines). As mentioned earlier, the second driver 510-2 transmits the serial data to a post-stage driver, such as the third driver 510-3. The transmission path of the parallel data PDIS is a multidrop path configured to allow the first to third drivers 510-1~510-3 to receive common setting data and provide synchronous data signals, as shown by an arrow 560 represented in dash lines.

FIG. 6 may serve to illustrate the operation of each driver when the light emitting device 500 operates in the second mode (test mode). In the test mode, the signal received by the serial data input terminal SDI of the first-stage driver (such as the first driver 510-1) comes from the serial data SDIS. Except for the first-stage driver (the first driver 510-1), the signal received by the serial data input terminal SDI of each driver comes from the data received by the parallel data input terminal PDI of the preceding-stage driver. For instance, the signal received by the serial data input terminal SDI of the second driver 510-2 comes from the data received by the parallel data input terminal PDI of the first driver 510-1, as shown by an arrow 650 represented in dashed lines. Simply put, according to the present embodiment, the control circuit in the driver may be applied to switch between the work mode and the test mode. When operating in the work mode (first mode), each driver (e.g., the drivers 510-1~510-3) outputs the data received at its serial data output terminal SDO by its serial data input terminal SDI. However, in the test mode (second mode), the driver outputs the data received at its serial data output terminal SDO by its parallel data input terminal PDI.

To sum up, in the driver of the LED, the driving method, and the light emitting device provided in one or more embodiments of the disclosure, each driver is equipped with the signal path structure corresponding to the test mode. This configuration involves transmitting the parallel data signal from the preceding-stage driver to the serial data input terminal of the next-stage driver, effectively converting the parallel data signal into the serial data signal for the next-stage driver. This mitigates the challenge of being unable to examine the driver at the end of a series of multiple stages of serially connected drivers due to potential circuit connection abnormalities in the serial-type data path. Accordingly, in one or more embodiments of the disclosure, the connection abnormalities in the relevant signal circuits across the multiple stages of drivers may be checked simultaneously by utilizing the signal path structure corresponding to the test mode of the driver, whereby the repetitive work hours required by the operating staff during the inspection process may be reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and ther equivalents.

What is claimed is:

1. A driver of a light emitting diode, comprising:

a first receiver, receiving a parallel data signal;

a second receiver, receiving a serial data signal;

a data controller, coupled to the first receiver;

a transmitter, coupled to the data controller, wherein the data controller obtains the parallel data signal through the first receiver and transmits the parallel data signal to a serial data output terminal through the transmitter to transmit the parallel data signal to a next-stage driver; and a check controller, coupled to the first receiver and the second receiver, detecting whether the parallel data signal is received through the first receiver and whether the serial data signal is received through the second receiver, and generating a driving signal of the light emitting diode based on the received parallel data signal and the received serial data signal to illuminate the light emitting diode.

2. The driver according to claim 1, wherein the driver has a work mode and a test mode, wherein the check controller is enabled in the test mode and is disabled in the work mode.

3. The driver according to claim 2, wherein in the test mode, the serial data signal in the next-stage driver is the same as the parallel data signal in a preceding-stage driver.

4. The driver according to claim 2, wherein in the test mode, the serial data signal received by the second receiver is transmitted to the check controller but not transmitted to the data controller.

5. The driver according to claim 2, further comprising:

a display controller, coupled to the data controller, wherein the display controller is enabled in the work mode and is disabled in the test mode, in the work mode, the second receiver is further coupled to the data controller, the data controller receives the serial data signal through the second receiver and transmits display data in the serial data signal to the display controller, and the display controller generates the driving signal of the light emitting diode based on the display data to illuminate the light emitting diode.

6. The driver according to claim 1, wherein the first receiver and the second receiver are first-in-first-out receivers, the transmitter is a first-in-first-out transmitter, and the driver is a driving chip of a light emitting device in a display.

* * * * *